Oct. 9, 1945.                    C. FISCHER                    2,386,175
           ADJUSTABLE CONNECTING BRIDGE FOR GOGGLE FRAMES
                    Filed Jan. 8, 1942          2 Sheets-Sheet 1
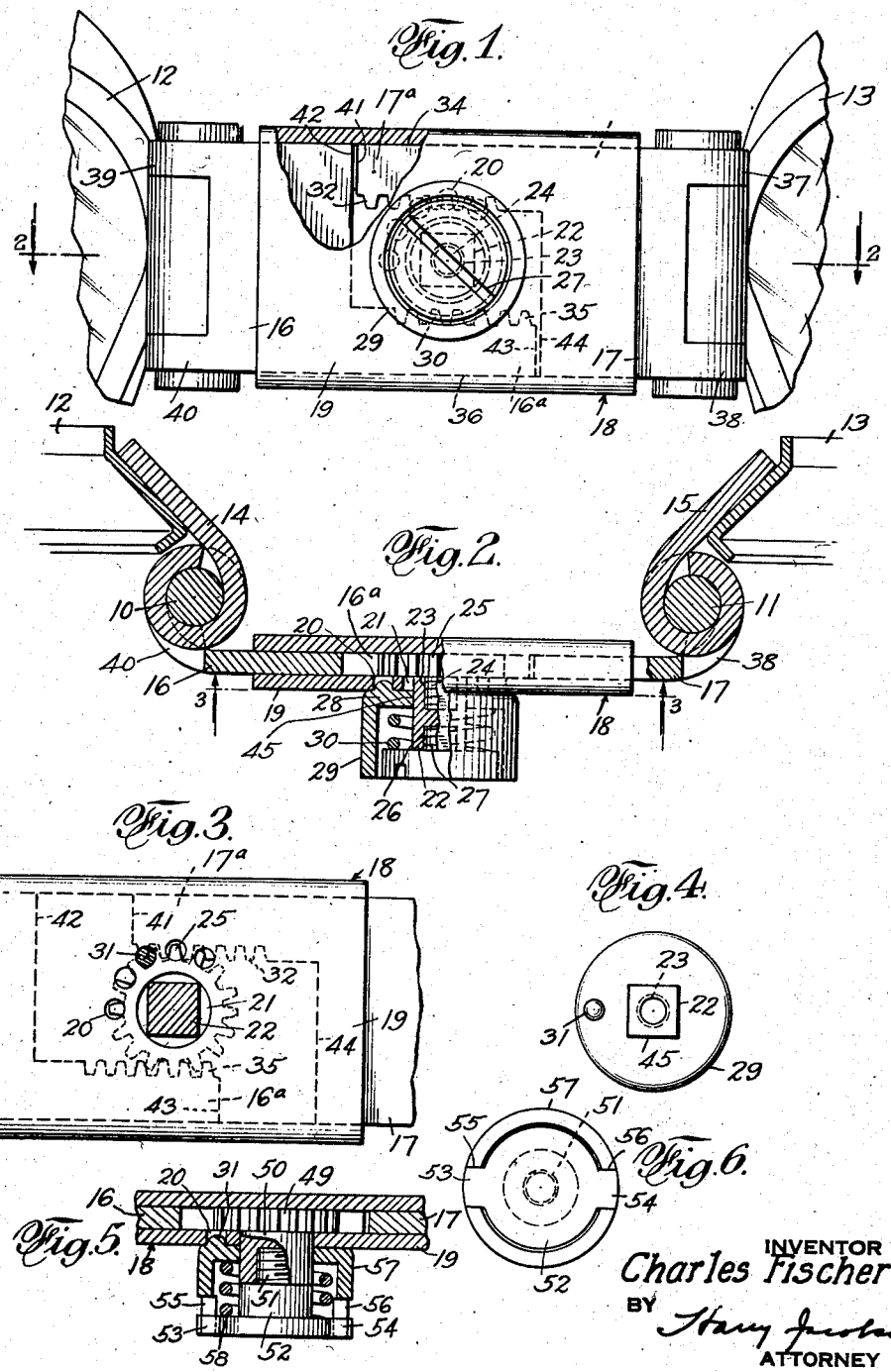
INVENTOR
Charles Fischer
BY
ATTORNEY Oct. 9, 1945. C. FISCHER 2,386,175
ADJUSTABLE CONNECTING BRIDGE FOR GOGGLE FRAMES
Filed Jan. 8, 1942 2 Sheets-Sheet 2
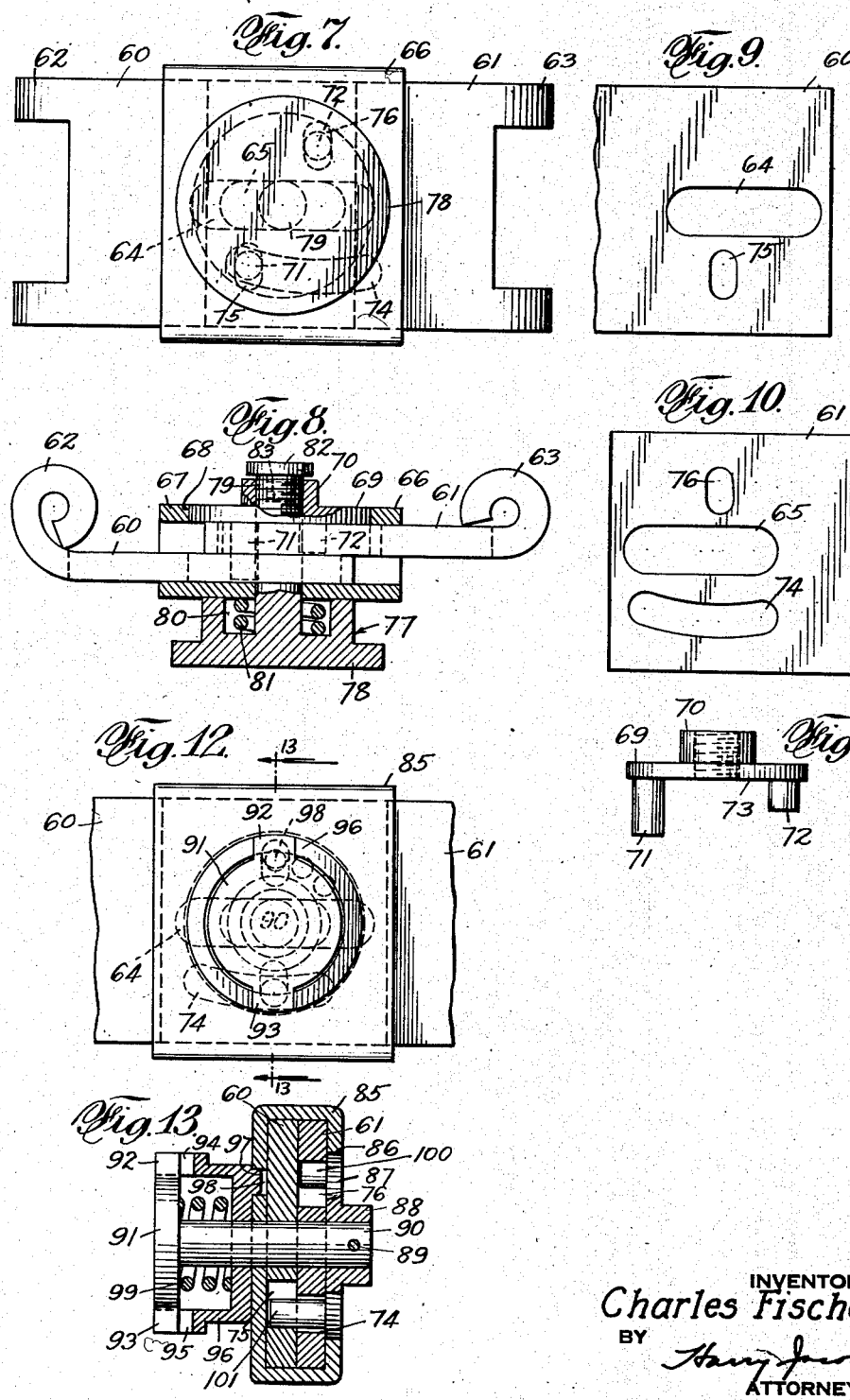
INVENTOR
Charles Fischer
BY
ATTORNEY Patented Oct. 9, 1945

2,386,175

UNITED STATES PATENT OFFICE 2,386,175

ADJUSTABLE CONNECTING BRIDGE FOR GOGGLE FRAMES

Charles Fischer, New York, N. Y.

Application January 8, 1942, Serial No. 425,950

17 Claims. (Cl. 88—43)

This invention relates to adjustable bridges for aviators' and the like goggles, and particularly to the means for adjusting the effective length of the bridge.

The invention contemplates the provision of bridge adjusting means comprising few parts easily and economically made and assembled and easily locked to maintain the adjustment, and requiring little skill and no tools for its operation.

The invention further contemplates the provision of bridge adjusting means giving a wide range of adjustment by a comparatively slight amount of rotation in the proper direction of the control member thereof, said member causing overlapping of the bridge parts to decrease the size of the bridge, or separating the bridge parts to increase the size of the bridge, thereby adjusting the eye frames of the goggles in which the bridge is used to the different spacing between the eyes of different users.

The invention further contemplates the provision of normally locked adjusting means, which, while simple, inexpensive and efficient, may be operated manually and easily by an axial unlocking pull followed by a rotary movement of the required amount, whereafter release of the adjusting means locks the parts automatically in the adjusted positions thereof.

The invention further contemplates the provision of an adjustable bridge having a pair of relatively movable parts operatively engaged by diametrically opposite points of a rotatable operating member, whereby rotation of said member adjusts the effective size of the bridge.

The various objects of the invention will be clear from the description which follows and from the drawings, in which, Fig. 1 is a front elevational view, partly broken away, of one form of my improved adjusting means as it appears applied to an aviator's goggles.

Fig. 2 is a horizontal section of the same taken on the line 2—2 of Fig. 1.

Fig. 3 is a vertical section of the same taken on the line 3—3 of Fig. 2.

Fig. 4 is a rear view of the control member and of the operated pinion support member associated therewith.

Fig. 5 is a partial top plan view and horizontal section of a modified form of the adjusting means.

Fig. 6 is a front elevational view of the same.

Fig. 7 is a front view of a now preferred form of the adjusting means in which the bridge parts are overlapped laterally and a pin and slot connection to the control member replaces the rack and pinion connection.

Fig. 8 is a horizontal section of the same.

Fig. 9 is a fragmentary view of one of the sliding bridge parts of Figs. 7 and 8, showing the slots therein.

Fig. 10 is a similar view of the other cooperating bridge part.

Fig. 11 is a top plan view of the operating pin-carrying disc.

Fig. 12 is a front view similar to Fig. 7 of another form of the adjusting means showing the automatic locking means of Figs. 5 and 6 applied to the slot and pin operating means.

Fig. 13 is a vertical section of the same taken on the line 13—13 of Fig. 12.

In the practical embodiment of the invention shown by way of example, and referring particularly to Figs. 1 to 4, the bridge preferably, though not necessarily, is hingedly mounted at its ends on the respective hinge pins 10 and 11. The bridge connects the eye frames 12 and 13 in the usual manner, each of said frames having the usual glass or lens inserted thereinto. The frame 12 carries the hinge part 14 having a terminal loop receiving the hinge pin 10, while the frame 13 carries the similar hinge part 15 provided with a suitable corresponding loop receiving the pin 11.

The bridge comprises the relatively slidable parts 16 and 17, preferably L-shaped, and slidably mounted within the casing 18 for adjusting movement in opposite directions. Said casing is preferably made in the form of a flattened metal tube of rectangular cross-section having open ends through which pass the respective bridge parts 16 and 17. The front wall 19 of the casing is provided with a series of locking apertures as 20 sufficient in number and properly spaced circumferentially to afford the desired selection of the amount of effective longitudinal relative movement of the slidable parts 16 and 17 and thereby selectively to determine the effective overall length of the bridge and the required spacing between the eye frames 12 and 13. Preferably, centrally of the casing wall 19 is provided the opening 21 through which passes the pinion hub or support 22 which, in the form being described, is preferably square or polygonal in cross-section. The diameter of said opening 21 is substantially the same as the largest cross-sectional dimension of the support 22, that is, substantially equal to the diagonal distance between the corner edges of the support, so that the wall of the opening 21 forms a bearing and guide for said support as said support is rotated, without permitting any other substantial movement of the support in any direction except rotation.

Said support is internally threaded at its inner end as 23 to receive the externally threaded shaft 24 projecting from the pinion 25, thereby to form a hub for the pinion rotatable therewith as a unit. At its outer end, the support 22 is also internally threaded as at 26 to receive the externally threaded shank of the screw 27 which is provided with an enlarged head. Between said head and the end wall or base 28 of the manually operable hollow control member 29, is arranged the spring 30, said spring urging the member 29 inwardly against the outer face of the wall 19 and toward the apertures 20. The projection 31 extending inwardly from the inner face of the base 28 is thereby urged into that one of the openings 20 with which it may register.

In the base 28 of the member 29 is formed the substantially square or polygonal opening 45 of the same shape and size as the cross-section of the support 22, into which opening said support member is fitted and passes loosely, whereby rotation of the member 29 in either direction causes rotation of the support member 22 and consequent rotation of the pinion 25 as a unit. When the projection 31 is in a selected one of the openings 20, the parts, including the pinion 25, the hub or support 22, and the control member 29 are locked together against accidental movement and in their adjusted positions.

Meshing with the pinion 25 is the longitudinally extending rack 32 arranged on that inner edge of the leg 17a of the L-shaped slidable part 17 which is nearest the pinion. The leg is of less width than the remainder of the part 17 and the edge 34 of said leg engages the inner top wall of the casing and is guided thereby in its movement, the parts 16 and 17 being held in place and also guided by the rear wall of the casing. Similarly, the leg 16a on the L-shaped slidable part 16 is provided with the rack 35 meshing with the diametrically opposite teeth of the pinion 25, and its lowermost edge 36 engages the inner surface of the bottom wall of the casing 18. The bridge part 17 terminates in a pair of spaced loops 37, 38 pivotally mounted on the hinge pin 11, while the part 16 similarly terminates in the spaced loops 39 and 40 pivotally mounted on the hinge pin 10, whereby the bridge is pivotally connected to the eye frames.

In the collapsed or contracted positions of the parts 16 and 17, that is, in that position of said parts effective to make the bridge of its minimum overall length, the free end edge 41 of the leg 17a is arranged close to or in contact with upright transverse edge 42 of the slidable part 16. In said position, the end edge 43 of the rack 35 is similarly adjacent to or in contact with the transverse edge 44 of the slidable part 17. The legs 16a and 17a thereby are arranged in transverse overlapping relation. In the extended positions of said parts, however, wherein the effective or overall length of the bridge is increased, the edges 41 and 42 are separated and the edges 43 and 44 are similarly separated.

To accomplish the adjustment of the bridge, the control member 29 is first pulled axially and in the proper direction to remove the projection 31 from that opening 20 in which it is located, thereby unlocking the bridge parts ready for further adjustment, that is, for shortening or lengthening the bridge. To increase the effective length of the bridge, the member 29 after being unlocked, is rotated in a clockwise direction as viewed in Fig. 1, thereby rotating the support 22 within the opening 21 and also rotating the pinion 25. Such rotation of the pinion causes the rack 32 and the slide part 17 to move toward the right, and simultaneously causes the rack 35 and its slide 16 to move toward the left, thus separating the frames 12 and 13. When the desired distance between the frames has been attained, the member 29 is released, whereupon the spring 30 urges said member inwardly to insert the projection 31 into that one of the openings 20 with which it is in registration. If it does not enter the selected opening, the member 29, after its release, may be turned additionally through a small angle to carry the projection into registration with the nearest opening 20, whereupon the spring 30 becomes effective to lock the parts against any further movement. To shorten the bridge, the above described operation is carried out in the same manner, excepting that the control member 29 is rotated in a counterclockwise direction.

In that form of the invention shown in Figs. 5 and 6, the pinion 49, which is similar to the pinion 25 and similarly arranged, is provided with an internally threaded hub 50 receiving the externally threaded shank 51 of the pinion support or operating member 52. Said member is provided with an enlarged head formed with a pair of diametrically opposed outwardly extending lugs or wings 53 and 54 entering respectively the corresponding co-axially disposed slots 55 and 56 of the control member 57. The spring 58, similar to the spring 30, is interposed between the head of the member 52 and the base or end wall of the control member 57 and urges the control member inwardly to cause the projection 31 thereof to enter the selected opening 20, it being understood that the control member is slidable on the member 52. The operation of this form of my invention is similar to that previously described, the control member 57 being first pulled axially away from the casing along the member 52 to remove the projection 31 from its locking opening and then rotated in the proper direction to cause the pinion to operate the racks 32 and 35 and thereby to adjust the overall length of the bridge in the manner already mentioned. The member 57 slides freely in an axial direction on the member 52, the opening in the base thereof loosely fitting the member 52 and serving as a bearing therefor. The wings 53, 54, however, and the slots 55, 56 insure rotation of the members 57, 52 and the pinion 49 as a unit.

It will be noted that in both forms of the invention, the control member, the pinion, and the parts operatively connecting the control member to the pinion, as well as the casing, remain at all times at the center of the bridge since the slidable bridge parts 16 and 17 are projected by precisely equal amounts beyond the respective ends of the casing or are retracted precisely equal amounts within the casing on the rotation of the control member. The resulting bridge is consequently symmetrical at all times about the axis of the control member, regardless of the various adjusted positions thereof.

In that form of the invention shown in Figs. 7 to 11 inclusive, and which is the now preferred form, the slidable bridge parts 60, 61 are of substantially rectangular outline and are arranged in laterally overlapping relation as best seen in Fig. 8. The part 60 terminates in the loops 62 adapted to receive the pin 10 connecting it to the goggle frame 12, while the bridge part 61 terminates in the loops 63 adapted to receive the hinge pin 11 pivoting it to the frame 13. Each of the bridge parts is provided with a longitudinally extending centrally arranged slot, as the slot 64 in the part 60 and the slot 65 in the part 61 for the purpose later to be described. Said bridge parts slide on each other and within the tubular casing 66, the rear wall 67 of which is provided with the opening 68. In said opening is rotatably mounted the pin-carrying disc 69 (Fig. 11), provided with the internally threaded hub 70 projecting from the inner wall thereof, and with the diametrically opposite pins 71, 72 of different lengths projecting from the outer wall 73 thereof and in radial spaced relation to the hub.

The pin 71 is made of sufficient length to pass freely through and to move freely in the preferably arcuate slot 74 in the bridge part 61, said slot 74 being arranged below the slot 65 and in position to properly receive the pin 71 and to permit movement of the pin in the slot as the operating disc 69 is rotated.

The pin 71 after passing through the slot 74, enters the upright slot 75 of the bridge part 60, which slot is arranged below the central slot 64 of said part. The pin 72, however, enters the slot 76 provided in the bridge part 61 above the slot 65 thereof.

To maintain the disc in its proper position and to permit locking thereof in place and thereby to lock the bridge parts in their adjusted position, the combined control and locking member 77 is provided. Said member is made in the form of a screw having a head 78 and an externally threaded shank 79 passing loosely through an opening in the front wall of the casing and screwed into the correspondingly threaded hub 70 of the operating disc. In the head 78 is formed the recess 80 receiving the spring 81, which, through the control member, urges the operating disc 69 toward the bridge parts 60, 61. A screw 82, having an enlarged head adapted to be brought into engagement with the hub 70 and having a shank 83 entering an internally threaded recess in the screw shank 79, rotates with said shank on the rotation of the control member and limits the amount of unlocking rotation of the control member to prevent separation thereof from the disc.

Unlocking of the parts for adjustment of the bridge is attained by rotation of the control member 77 in the proper direction, whereby the disc 69 moves inwardly relatively to the control member and releases the pressure thereof upon the bridge parts 60, 61. After the pressure on the parts has been released and the parts have been thus unlocked, the bridge parts 60, 61 are pulled apart to increase the effective length of the bridge or pushed together to reduce said length to the desired overall amount. During this operation, the pin 71 is urged by the slot 75 in one direction, while the pin 72 is urged by the slot 76 in the opposite direction, thereby rotating the now loose disc 69 together with the control member 77, sufficient resistance to the movement of the bridge parts 60, 61 being provided by the spring 81 which urges the member 77 outwardly and thereby exerts sufficient pressure therethrough on the disc 69 to prevent the parts from becoming too greatly separated. After the bridge parts have been adjusted in the manner described while they are held so adjusted, the control member 77 is rotated in the proper direction to tighten the parts, the shank 79 moving through the hub 70 and thereby moving the hub toward the bridge part 61 to tighten it against the bridge part 60 which is in turn pressed against the front wall of the casing, thereby to clamp or lock the mechanism in the adjusted position.

In the form of the invention shown in Figs. 12 and 13, the bridge parts 60 and 61 are substantially identical with those described in connection with Figs. 7 to 11 and are mounted for sliding movement within the casing 85. Said casing is provided with the opening 86 in its rear wall to receive the disc 87. The hub 88 of the disc, however, is not threaded, but is pinned as by means of the pin 89 to the shank 90 of the operating member for rotational movement as a unit therewith. The head 91 of said member is provided with wings 92, 93, similar to the wings 53, 54 of Fig. 6, said wings being arranged to move axially of the shank in the respective slots 94, 95 of the hollow control member 96. The shank 90 passes loosely through an opening in the front wall of the casing and also passes loosely through the base of the control member. Said control member is provided with the projection 97, similar to the projection 31 of Fig. 5, entering a selected one of the locking perforations or openings in the front wall of the casing. The spring 99 urges the control member 96 inwardly and thereby urges the projection 97 into its locking position in the selected opening 98. The member 87 is provided with the pins 100, 101 of unequal length entering the slots 76, 75 respectively of the slide members and operating similarly to the pins 71, 72 of Fig. 11.

To adjust the bridge, the control member 96 is moved outwardly against the action of the spring 99 to remove the projection 97 from its opening 98, thereby releasing the shank 90 for rotation. Rotation of the control member in its outward position rotates said shank 90 through the wings 92, 93, thereby rotating the disc 87 and rotating the pins 100, 101 in opposite directions to operate the slidable bridge parts 60, 61 in the required directions and thereby to lengthen or shorten the overall length of the bridge. Release of the control member 96 permits the spring 99 to urge the control member toward the casing 85 and thereby to reinsert the projection 97 into the nearest opening 98, whereby the parts are locked in the adjusted positions thereof.

It will be seen that I have provided a simple and efficient bridge adjusting mechanism adapted for commercial manufacture, which acts through a rotatable operating member to move the adjustable bridge parts in opposite directions, the parts being protected, supported and guided in a casing during adjustment and being readily locked in place after the adjustment thereof to prevent accidental disturbance of the adjustment.

Any variation or modification of the invention described above which does not depart from the spirit of the invention is intended to be included within the scope of the appended claims.

I claim:

1. In goggles, an adjustable bridge comprising a pair of overlapping bridge members, each of said members having a non-circumferential slot therein, a disc rotatably mounted adjacent the overlapped parts of the members, the slot of one member being on the opposite side of the axis of the disc from the slot in the other member, a first pin on the disc passing loosely through one of the members and into the slot of the other member, and a second pin on the disc on the other side of the axis of the disc from said first pin and shorter than the first pin entering the slot of said one of the members, whereby longitudinal movement of the members in opposite directions simultaneously rotates the disc and rotation of the disc causes simultaneous longitudinal movement of the members in opposite directions.

2. In goggles, a guide casing, a pair of bridge members slidable longitudinally in the casing and guided thereby, each of the bridge members having an inner edge in transverse spaced relation to the inner edge of the other bridge member, a longitudinally extending rack on the inner edge of each of the bridge members, a pinion having a hub mounted in the casing, said pinion being arranged between and engaging said racks, a rotatable control member slidable on the hub and operatively connected thereto for rotation as a unit with the pinion, said control member being spring-pressed toward the casing, and cooperating means on the control member and on the casing operative in that position of the control member in which the control member is nearest the casing for locking the control member in any selected one of a number of different rotated positions relatively to the casing.

3. In an optical mounting, an adjustable bridge comprising a pair of substantially flat overlapping slotted bridge members arranged in face to face relation, a rotatably mounted disc engaging the rear one of said members, a pair of pins of unequal length carried by the disc, the shorter of said pins entering a slot of the rear bridge member, said slot being arranged non-circumferentially of the disc and on one side of the axis of the disc, the longer pin passing loosely through the rear bridge member and entering a similar slot of the front bridge member, said slot being arranged on the other side of the axis of the disc, and releasable means for locking the disc against rotation.

4. An optical mounting according to claim 3 in which the locking means comprises a manually operable member having a head and a screw threaded shank screwed into the disc, the head and the disc being on opposite sides of the bridge members and a spring interposed between the head and the bridge members to maintain the disc in pressed engagement with the rear bridge member when the manually operable member is unscrewed from its locking position, in which position the manually operable member is screwed tightly into the disc with the bridge members clamped therebetween.

5. An optical mounting according to claim 3 in which the locking means comprises a shaft extending forwardly of the disc and through the bridge members, a control member slidable on the shaft and revoluble therewith and having longitudinal slots therein, an enlarged head on the shaft having extensions entering the slots of the control member and forming an operative connection between the control member and the shaft and means for maintaining the control member against rotation in any one of a number of different rotated positions thereof when the control member is moved into its rearmost position on the shaft.

6. In an optical mounting, a pair of relatively slidable overlapping bridge members, rotatable means having an operative connection with said members for longitudinally adjusting said members, and means for maintaining said members in the adjusted positions thereof comprising a threaded disc engaging the rear one of said members, and a screw passing through the bridge members and entering the disc and having an enlarged head arranged in front of the bridge members and adapted to clamp said bridge members between the head and the disc when the screw is tightened, and a spring around the screw between the head thereof and the adjacent bridge member.

7. In goggles, a pair of relatively slidable bridge parts arranged in overlapping relation, a tubular casing surrounding adjacent overlapping portions of said parts and having an opening in the front wall thereof and having a series of circumferentially spaced locking perforations therein in radially and outwardly spaced relation to the first mentioned opening, a first rotatable member passing through said opening, a manually operable control member slidably mounted on the front end of said first member, a projection on said control member arranged to enter a selected one of said perforations thereby to lock the control member against rotation, an operative connection between the control member and said first member permitting relative sliding movement of said members and connecting said members for rotation as a unit when said projection is removed from said perforation, a second rotatable member secured to the rear end of said first member and having diametrically opposed projecting portions thereon arranged within the casing and in operative engagement respectively with the respective bridge parts to slide said parts relatively to each other and a spring surrounding the first member and urging the control member and said rotatable members in opposite directions, the control member being urged toward the casing thereby to maintain the projection in the selected perforation when the control member is released.

8. In goggles of the character described, a bridge comprising a pair of substantially flat overlapping slidable members, means for adjusting the effective length of the bridge, said means comprising a rotatable member arranged with its axis substantially perpendicular to the slidable members, an enlargement secured to the rear end of the rotatable member and adapted to contact the rear face of the rear one of the slidable members, and cooperating interengaging means on the enlargement and slidable members to transmit movement of a selected member to the other member, and means urging the front end of the rotatable member away from the slidable members for normally clamping the enlargement against the rear face of said rear one of the slidable members thereby to resist movement of the slidable members.

9. In goggles, an adjustable bridge comprising a pair of overlapping bridge members, a rotatable member arranged with its axis substantially perpendicular to the bridge members and engaging one of said bridge members, one of said bridge members having a non-circumferential slot therein on one side of the axis of the rotatable member, and the other bridge member having a similar slot therein on the other side of said axis, a first pin on the rotatable member arranged on one side of the axis thereof and entering the slot of and in operative engagement with said one only of the bridge members, and a second pin on the rotatable member passing through said one of the bridge members and into the slot of the other bridge member and arranged on the other side of the axis of the rotatable member and in operative engagement with the other only of the bridge members.

10. In goggles, a bridge comprising a pair of relatively slidable members, each having substantially flat front and rear faces, at least one of the faces of one member being substantially coplanar with a face of the other member, adjusting means operatively connected to the members to slide the members simultaneously in opposite directions and thereby to adjust the combined effective length of said members, said means including a rotatable element, and means for normally locking said adjusting means and the members in the adjusted positions thereof, said locking means comprising a rotatable control member rotatable about and movable longitudinally along an axis substantially perpendcular to the general plane of said slidable members into and out of pressed engagement with the casing hereinafter mentioned, a casing passing around said members and supporting the adjusting means, and means for normally maintaining the control member in pressed engagement with the front part of the casing normally to prevent rotation of the control member and of the aforesaid rotatable element, said control member operatively engaging said rotatable element to rotate therewith on the release of the pressed engagement between the control member and the casing and to prevent rotation of the element when rotation of the control member is prevented.

11. In goggles, a pair of bridge members each having non-circumferential slots therein and arranged in face to face slidable relation, a casing slidably supporting the members, a rotatable operating member passing through an opening in the casing and through the bridge members, a disc secured to the rear end of the rotatable member behind the rear bridge member and engaging the rear face of said rear member, diametrically opposed pins on the disc fitted into the respective slots of the bridge members, and a spring at the front end part of the rotatable member urging said end in an axial direction away from the casing and thereby pressing the disc against the rear bridge member.

12. In goggles, a pair of bridge members, rotatable means for moving said members in opposite directions including a revoluble element operatively connected to the bridge members and having a pair of opposed substantially radial extensions, a control member having a pair of opposed slots receiving said extensions respectively, said control member being slidable on the revoluble element to an unlocked position and being revoluble with said revoluble element, said slots being parallel to the axis of the control member and of sufficient length to permit movement of the control member from a locked to an unlocked position, and means for locking the control member against rotation in a selected position and thereby locking the element against rotation, said locking means including a spring urging the control member toward the locked position thereof.

13. In goggles, a casing, a pair of bridge members slidable in the casing, means for sliding said members in opposite directions including a revoluble element engaging said members, a support member projecting from the revoluble element to rotate the same and provided with a pair of opposed transverse extensions, a control member slidable axially on the support member and rotatable therewith as a unit, said control member having a pair of opposed slots receiving and cooperating with the extensions of the support member, said slots being parallel to the axis of the control member and of sufficient length to permit sliding movement of the control member on the support member from a locked to an unlocked position, the extensions sliding in the slots to form an operative connection between said support and control members and means, including a spring urging the control member toward the locked position thereof, cooperating with the casing for locking the control member against rotation when said control member is moved on the support member to its locked position and thereby locking the support member and the revoluble element as a unit relatively to the casing in any selected one of a number of different positions.

14. In goggles, an adjustable bridge comprising a pair of overlapping bridge members each having a longitudinally arranged middle slot therein, one of said members having a longitudinally arranged curved slot below the middle slot and having a transversely arranged slot above the middle slot, the other of said members having a transversely arranged slot below the middle slot, a tubular casing around the members and open at both ends, said members projecting through the respective open ends of the casing, a disc rotatably mounted in the casing, a pair of pins carried by the disc and arranged respectively on opposite sides of the center of the disc and of unequal length, the longer of said pins passing through the curved slot of said one of the bridge members and into the transverse slot of the other bridge member, the shorter pin entering the transverse slot of said one of the bridge members, and a manually operable member having a head outside of the casing and having a shank passing through a wall of the casing and through the middle slots of the bridge members and secured to the disc.

15. In goggles having a pair of eye frames, a bridge adjustably connecting the frames and comprising a toothed member connected to one of the frames, a similar toothed member connected to the other frame, a pinion engaging the teeth of both toothed members, means normally locking the pinion against rotation including a manually rotatable spring-pressed control member mounted for axial sliding movement relatively to the pinion, a casing around the toothed members, said control member being urged toward the casing, and locking elements on the control member and on the casing, said elements interengaging to lock the control member to the casing when the control member is moved toward the casing, said locking elements being disengaged from each other when the control member is moved away from the casing, and means operatively connecting the control member to the pinion to rotate the pinion on the disengagement of the locking elements and the rotation of the control member and thereby to move the bridge members toward and from each other.

16. In goggles having a pair of eye frames, a casing having a plurality of circumferentially spaced openings therein, a first bridge member slidable in the casing and secured to one frame, a first rack on the member, a second similar bridge member slidable in the casing, a second rack on the second bridge member parallel to and in transverse spaced relation to the first rack, a pinion engaging said racks, and a manually operable control member having an operative connection to the pinion, said control member being mounted to slide in opposite directions axially of the pinion and having a projection insertable into a selected one of the casing openings to lock the control member and the pinion against rotation when the control member is moved axially in one direction, said control member being releasable for rotation with the pinion as a unit when the control member is moved axially in the opposite direction a sufficient distance to withdraw the projection from the opening.

17. In goggles according to claim 9, a manually rotatable element secured to the rotatable member at one end and having an enlarged head at the other end, the enlarged head and the rotatable member being respectively on opposite sides of the bridge members, and a spring engaging said head and urging said head away from the bridge members and thereby urging the rotatable member against said one bridge member.

CHARLES FISCHER.